United States Patent
Bovero et al.

(10) Patent No.: US 12,269,967 B2
(45) Date of Patent: *Apr. 8, 2025

(54) METHODS FOR MAKING ANTIFOULING MATERIALS

(71) Applicant: Saudi Arabian Oil Company, Dhahran (SA)

(72) Inventors: Enrico Bovero, Dhahran (SA); Aziz Fihri, Dhahran (SA); Yassine Malajati, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 287 days.

This patent is subject to a terminal disclaimer.

(21) Appl. No.: 17/564,399

(22) Filed: Dec. 29, 2021

(65) Prior Publication Data

US 2023/0203320 A1 Jun. 29, 2023

(51) Int. Cl.
C09D 5/16 (2006.01)
B82Y 40/00 (2011.01)

(52) U.S. Cl.
CPC .......... *C09D 5/1681* (2013.01); *C09D 5/1606* (2013.01); *B82Y 40/00* (2013.01)

(58) Field of Classification Search
CPC ..... C09D 5/1681; C09D 5/1606; B82Y 40/00
See application file for complete search history.

(56) References Cited

U.S. PATENT DOCUMENTS

| | | | |
|---|---|---|---|
| 3,997,461 A | 12/1976 | Davie | |
| 5,397,385 A | 3/1995 | Watts | |
| 5,925,370 A | 7/1999 | Bullat et al. | |
| 8,309,625 B1 | 11/2012 | Ramotowski | |
| 10,221,321 B2 | 3/2019 | Addleman et al. | |
| 2007/0167524 A1 | 7/2007 | Helsing et al. | |
| 2010/0256256 A1* | 10/2010 | Schetz | A01N 37/50 568/687 |
| 2020/0248008 A1* | 8/2020 | Hoffman | C09D 171/02 |
| 2023/0203321 A1* | 6/2023 | Bovero | C09D 5/1656 424/78.09 |

FOREIGN PATENT DOCUMENTS

| | | | |
|---|---|---|---|
| CN | 1312238 C | 4/2007 | |
| CN | 103694839 A | 4/2014 | |
| CN | 102675946 B | 12/2016 | |
| CN | 104479487 B | 12/2016 | |
| CN | 110628253 A | 12/2019 | |
| CN | 1477166 A | 2/2024 | |
| KR | 102132728 B1 | 7/2020 | |
| RU | 2010121866 A | 12/2011 | |
| WO | WO-2015031956 A1 * | 3/2015 | A01N 25/34 |

OTHER PUBLICATIONS

Lee, Su Yeon, Yudi Rahmawan, and Shu Yang. "Transparent and superamphiphobic surfaces from mushroom-like micropillar arrays." ACS applied materials & interfaces 7.43 (2015): 24197-24203. (Year: 2015).*
Zhang, Ying, et al. "Replica molding of high-aspect-ratio polymeric nanopillar arrays with high fidelity." Langmuir 22.20 (2006): 8595-8601. (Year: 2006).*
Akyuz, Lalehan, et al. "Supplementing capsaicin with chitosan-based films enhanced the anti-quorum sensing, antimicrobial, anti-oxidant, transparency, elasticity and hydrophobicity." International journal of biological macromolecules 115 (2018): 438-446. (Year: 2018).*
Libre Texts, 21.7: Chemistry of Amides, obtained online at: https://chem.libretexts.org/@go/page/36404, downloaded on Oct. 13, 2024. (Year: 2022).*
Baby et al., Catechol-Amine-Decorated Epoxy Resin as an Underwater Adhesive: A Coacervate Concept Using a Liquid Marble Strategy, ACS Omega 2023 8 (8), 7289-7301 (Year: 2023).*
Zhou, Wenjun, et al. "Synthesis and evaluation of phenolic capsaicin-derived self-polymers for antibacterial activity." Process Biochemistry 132 (2023): 30-40. (Year: 2023).*
Nishimoto et al., "Bioinspired self-cleaning surfaces with superhydrophobicity, superoleophobicity, and superhydrophilicity", Royal Society of Chemistry, vol. 3, pp. 671-690, 2013.
Yun et al., "Superhydrophobic lotus-leaf-like surface made from reduced graphene oxide through soft-lithographic duplication", Royal Society of Chemistry, vol. 10, pp. 5478-5486, 2020.
Lu et al., "Flexible Hydrophobic Antifouling Coating with Oriented Nanotopography and Nonleaking Capsaicin", ACS Applied Materials & Interfaces, vol. 10, No. 11, pp. 9718-9726, 2018.
Wang et al., "Performance assessment of capsaicin derivatives containing amide groups used as active substances for antifouling coatings", Progress in Organic Coatings, vol. 160, 7 pages, Nov. 2021.
Saudi Arabia Examination Report pertaining to Application No. 122440939 dated Jan. 1, 2024.

* cited by examiner

*Primary Examiner* — Abigail Vanhorn
(74) *Attorney, Agent, or Firm* — DINSMORE & SHOHL LLP

(57) ABSTRACT

According to one or more embodiments, an antifouling material may be produced by forming a nanostructured mold, where a liquid mold precursor is contacted with a textured surface of a nanostructured template, the liquid mold precursor is solidified to the nanostructured template, and the formed nanostructured mold is removed from the nanostructured template. The antifouling material may be formed by contacting a liquid precursor mixture with a textured surface of the nanostructured mold, solidifying the liquid precursor mixture onto the nanostructured mold, and removing the formed antifouling material from the nanostructured mold. The antifouling material may include a nanostructured surface and may further include a toxin.

14 Claims, 2 Drawing Sheets

METHODS FOR MAKING ANTIFOULING MATERIALS

TECHNICAL FIELD

The present disclosure generally relates to antifouling materials and the methods for the production thereof and, more specifically, to antifouling coatings and the methods utilized in the making thereof.

BACKGROUND

Biofouling effects may commonly occur on the surfaces of marine vessels and offshore pipelines which may be damaged due to the adhesion of microorganisms to the surfaces of these objects. Many types of antifouling paints and coatings are created to deter biofouling on such surfaces. However, many conventional antifouling paints and coatings contain toxic chemicals that can pose serious health risks and have a negative impact on the environment. While there are antifouling paints and coatings that are able to deter biofouling effects, new antifouling materials are needed.

SUMMARY

According to embodiments described herein, antifouling materials, which may be utilized as coatings, may be made by forming a nanostructured mold and then forming an antifouling material. The nanostructured mold may be formed by contacting a liquid mold precursor with a textured surface of a nanostructured template. As such, the nanostructured mold has a complementary surface with respect to the textured surface of the nanostructured template. Then, the antifouling material is formed by contacting a liquid precursor with a textured surface of the nanostructured mold. The antifouling material is, therefore, imparted with a nanostructured surface complementary to the nanostructured mold and similar or identical to that of the nanostructured template, which is hydrophobic and impedes fouling. Additionally, the antifouling material is made from a polymer and a toxin, which also imparts antifouling properties. The polymer containing antifouling material may be suitable for use in the processes described herein, which forms the nanostructured surface. The combination of the nanostructured surface along with a toxin being present in the bulk material of the antifouling material allows for good antifouling characteristics.

According to one or more embodiments of the present disclosure, an antifouling material may be made by a method comprising forming a nanostructured mold. The nanostructured mold may be formed by contacting a liquid mold precursor with a textured surface of a nanostructured template, solidifying the liquid mold precursor to form the nanostructured mold, and separating the nanostructured mold and the nanostructured template. The nanostructured mold may comprise textured surface having a complementary surface with respect to the textured surface of the nanostructured template, such that at least a portion of the nanostructured mold comprises a nanostructured surface. The antifouling material may then be formed by contacting a liquid precursor mixture with a textured surface of the nanostructured mold, solidifying the liquid precursor mixture to form the antifouling material, and separating the antifouling material and the nanostructured mold. The antifouling material may comprise a textured surface having a complementary surface with respect to the textured surface of the nanostructured mold, such that at least a portion of the antifouling material comprises a nanostructured surface. The liquid precursor mixture may comprise a polymer precursor. The antifouling material may comprise a polymer. The liquid precursor mixture and the antifouling material may comprise a toxin.

These and other embodiments are described in more detail in the Detailed Description. It is to be understood that both the foregoing general description and the following detailed description present embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various embodiments and, together with the description, serve to explain the principles and operations of the invention. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and wherein.

DETAILED DESCRIPTION

Figure 1:
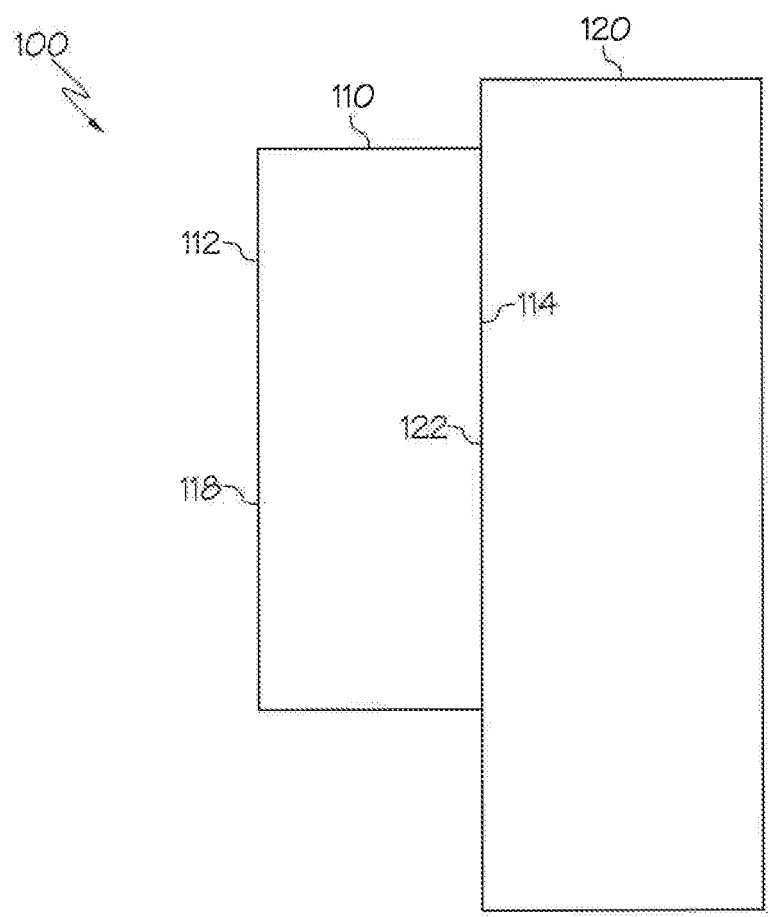
FIG. 1 schematically illustrates an antifouling coating applied to the surface of a substrate, according to one or more embodiments of the present disclosure.

Reference will now be made in greater detail to various embodiments, some embodiments of which are illustrated in the accompanying drawings. Now, referring to FIG. 1, a coated substrate 100 is depicted. According to one or more embodiments, the coated substrate 100 may include an antifouling material 110 and a substrate 120. The antifouling material 110 may generally be deposited upon a surface 122 of the substrate 120. As depicted in FIG. 1, the antifouling material 110 may comprise a first major surface 112 and a second major surface 114, where the second major surface 114 may be opposite of the first major surface 112. In such embodiments, the second major surface 114 may directly contact the substrate 120 at surface 122. At least a portion of the first major surface 112 may be textured (although not depicted as textured in FIG. 1). The textured portion 118 of the first major surface 112 may comprise a nanostructured surface.

In one or more embodiments, the antifouling material 110 may be a coating. The term "coating" refers to a layer or covering that may be applied to the external portion of the substrate 120. The term "substrate" refers to an object on which the coating may be applied. In one or more embodiments, the antifouling material 110 may be a coating that is applied to at least one surface 122 in a marine environment. The term "marine environment" refers to any location where the substrate 120 is in contact with water from the ocean, sea, or any like body of water.

As described above, in one or more embodiments, the antifouling material 110 may comprise a first major surface 112 and a second major surface 114. The first major surface 112 and the second major surface 114 may be substantially planar. A distance between the first major surface 112 and the second major surface 114 may define a thickness of the antifouling material 110. The antifouling material 110 may be a "sheet" such that the length and width of the first major surface 112 and/or the second major surface 114 are much greater than the thickness of the antifouling material 110. For example, the ratio of the length or width of the first major surface 112 and/or the second major surface 114 may be at least 10 times, at least 20 times, at least 50 times, at least 100 times, or even at least 1000 times greater than the thickness of the antifouling material 110.

In one or more embodiments, the antifouling material 110 may be a coating that may be applied to the substrate 120 where the first major surface 112 of the antifouling material 110 faces away from the substrate 120. The antifouling material 110 may be produced as a bulk body, such as a sheet, and then applied to the substrate 120. In one or more embodiments, the first major surface 112 may face and contact the environment surrounding the substrate 120. The term "environment" refers to the natural conditions surrounding the substrate 120 associated with, but not limited to, the presence of air, earth, water, and the like. The environment, in one or more embodiments, may be a marine environment, either above or below water level. For example, in one or more embodiments, the antifouling material 110 may be a coating on the substrate 120 in a marine environment where the first major surface 112 faces outward towards water which may include, but is not limited to, bacterial microorganisms and/or biofilms.

In one or more embodiments, the substrate 120 may include a portion of any floating platform that contains a surface 122 that externally faces the surrounding environment of the floating platform. In one or more embodiments, the substrate 120 may include a portion of a boat that contains a surface 122 that externally faces the surrounding environment of the boat. In one or more embodiments, the substrate 120 may include a portion of an offshore pipeline that contains a surface 122 that externally faces the surrounding environment of the pipeline. In one or more embodiments, the substrate 120 may include a portion of an oil platform, offshore platform, offshore drilling rig, or the like that contains a surface 122 that externally faces the surrounding environment of the oil platform, offshore platform, offshore drilling rig, or the like.

In one or more embodiments, at least a portion of the first major surface 112 may be a textured surface 118 that comprises a nanostructured surface. The textured surface 118 may comprise up to the entire, or near entire, surface area of the first major surface 112. In additional embodiments, other portions of the antifouling material 110 may be textured and comprise a nanostructured surface. For example, at least a portion of the second major surface 114 may be a textured surface that comprises a nanostructured surface. The textured surface may comprise up to the entire, or near entire, surface area of the second major surface 114. In additional embodiments, the entire, or near entire, body of the antifouling material 110 may comprise nano structure.

The terms "nanostructure", "nanostructured", "nanotexture", or the like refer to a structure that may comprise an average surface feature size of less than 100 nm. The term "surface feature size" refers to the size of discernable geometric bodies on the surface of a material. A nanotextured material may contain distinguishable surface elements at a scale of less than 100 nm, and the size of the average surface feature is less than 100 nm. Surface features may be determined by microscopy or other suitable methods, such as by scanning electron microscope.

In one or more embodiments, the nanostructured surface may comprise protruding features that are all of comparable size and shape. In some embodiments, the nanostructured surface may comprise protruding features that are all discernible in nanoscale measurements (such as less than 100 nm). In one or more embodiments, the nanostructured surface may comprise hierarchical features where smaller features may protrude over larger features. In one or more embodiments, the nanostructured surface may comprise protruding features that are in both microscale and nanoscale. For example, in one or more embodiments, larger features may be present in the microscale and smaller features may be present in the nanoscale and protrude over the larger features.

Generally, nanostructured surfaces have relatively great water contact angles. The term "water contact angle" refers to the angle formed between a substrate and a bead of a water at its interface, which quantifies the wettability of the solid surface. The term "bead" refers to a small drop of liquid. In one or more embodiments, the portion of the first major surface 112 that comprises the nanostructured surface has a water contact angle of at least 100 degrees. In additional embodiments, the first major surface 112 comprising the nanostructured surface may have a water contact angle of at least 110 degrees, at least 120 degrees, at least 130 degrees, at least 140 degrees, at least 150 degrees, or even at least 160 degrees.

In one or more embodiments, the nanostructured surface may allow the antifouling material to be hydrophobic. The term "hydrophobic" refers to a material that tends to repel, and fails to mix, with water. In one or more embodiments, the nanostructured surface may allow the antifouling material to be superhydrophobic. The term "superhydrophobic" refers to a material that repels water to the degree where water droplets do not flatten but rather roll off of the material. For example, in one or more embodiments, a hydrophobic material may exhibit a water contact angle of at least 90 degrees. Further, in one or more embodiments, a superhydrophobic material may exhibit a water contact angle of at least 150 degrees.

In one or more embodiments, the antifouling material 110 may comprise a polymer. The term "polymer" refers to a substance that has a molecular structure that consists partly or entirely of a large number of monomers bonded together. For example, in one or more embodiments, the antifouling material 110 may comprise epoxy, or a similar polymer. According to additional embodiments, the polymer may be chosen from one or more of thermosetting polymers including, but not limited to, epoxy resins, vinyl ester resins, polyurethanes, silicone resins, combinations thereof, or the like.

In one or more embodiments, the antifouling material 110 may comprise a toxin. The term "toxin" may refer to a chemical substance that destroys the physical structure of a targeted microorganism. In one or more embodiments, the presence of the toxin in the antifouling material 110 may provide the material antifouling characteristics. The term "antifouling characteristics" refers to the abilities of an antifouling object to deter the growth or facilitate detachment of subaquatic organisms, to act as a barrier against corrosion on metal surfaces, and/or to improve the flow of water past an object. In one or more embodiments, the antifouling material 110 that comprises a toxin may break the cell walls of bacteria, preventing the contact of bacteria and the surface of the substrate 120. In one or more embodiments, the antifouling material 110 that comprises a toxin may prevent the formation of biofilms on the surface 122 of the substrate 120.

While the toxin may be toxic to harmful organisms like bacterial microorganisms in a marine environment, the toxin may not be toxic to animals or the like. For example, in one or more embodiments, the toxin may comprise a chemical that breaks the cell walls of bacteria, yet has no harmful effect on the health of a human. According to some embodiments, the antifouling material may be void of non-environmentally friendly toxic chemicals and instead only contain chemicals that are more environmentally friendly. The term "environmentally friendly" refers to a material or a process that has less of a harmful impact to the atmosphere or associated environmental surroundings. For example, in one or more embodiments, the toxin may be capsaicin which may be considered more environmentally friendly and may have limited harmful effects on the health of a human.

In one or more embodiments, the antifouling material 110 may be produced by reacting a prepolymer and a toxin. The term "prepolymer" refers to a monomer or system of monomers that are reacted during the polymerization process. In one or more embodiments, the antifouling material 110 may form from the reaction of an epoxy prepolymer and at least the toxin. For example, in one or more embodiments, the epoxy prepolymer may be diglycidyl ether of bisphenol prepolymer (DGEBA). In one or more embodiments, the antifouling material 110 may be produced by reacting the prepolymer, the toxin, and a curing agent. The term "curing agent" refers to a substance that is used to harden a material by facilitating the bonding of the molecular components of the material. For example, in one or more embodiments, the curing agent may be isophorone diamine or 4,4'-methylenedianiline (IPDA).

In one or more embodiments, the toxin may comprise an amino group. The term "amino group" refers to a functional group on a compound that contains a basic nitrogen atom with a lone pair of electrons. For example, the toxin in the antifouling material 110 may comprise capsaicin, which has a chemical structure that contains one nitrogen atom with a lone pair of electrons.

In one or more embodiments, the toxin may be covalently bonded to the polymer. The nitrogen atom in the amino group of the toxin may be covalently bonded to a carbon atom of the polymer. In one or more embodiments, the amino group of the toxin may open the epoxy ring of the prepolymer and chemically bond to a carbon atom of the polymer compound. The term "epoxy ring" refers to a cyclic ether with a three-atom ring. For example, in one or more embodiments, diglycidyl ether of bisphenol prepolymer (DGEBA), as depicted below in Chemical Structure A, capsaicin, as depicted below in Chemical Structure B, and isophorone diamine, as depicted below in Chemical Structure C, may be mixed and cured, where the amino group of the capsaicin opens the epoxy ring of the diglycidyl ether of bisphenol prepolymer (DGEBA) and the nitrogen atom of the amino group of the capsaicin covalently bonds itself to a carbon atom of the forming epoxy polymer, as depicted below in Chemical Structure D. Capsaicin may also covalently bond to the epoxy resin via a reaction of the hydroxyl groups with the epoxy rings.

Chemical Structure A

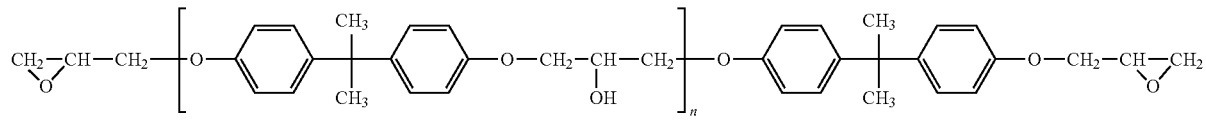

Chemical Structure B

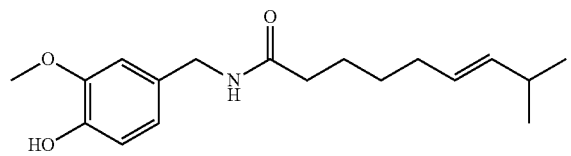

Chemical Structure C

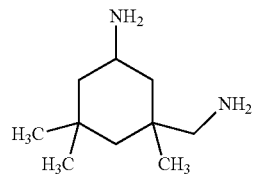

Chemical Structure D

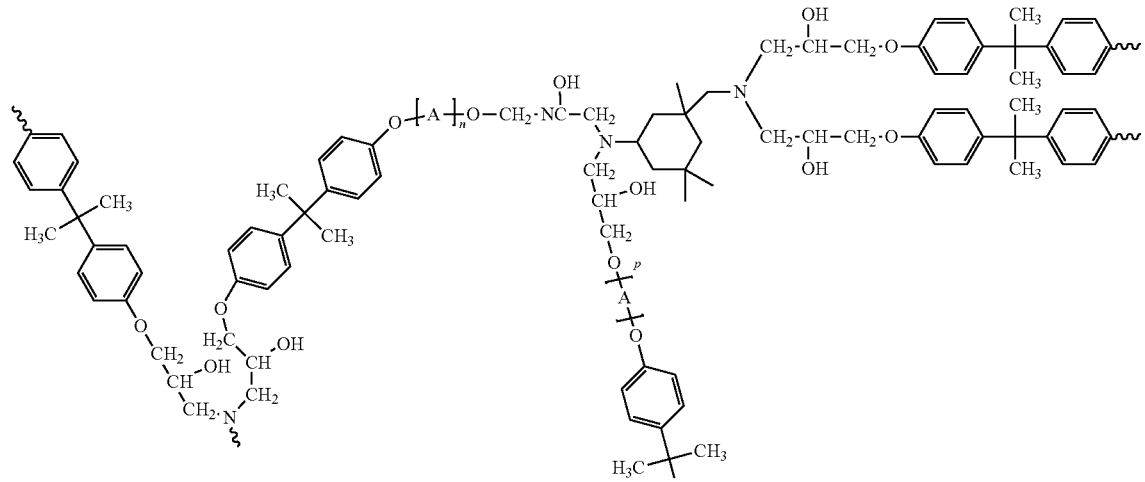

-continued

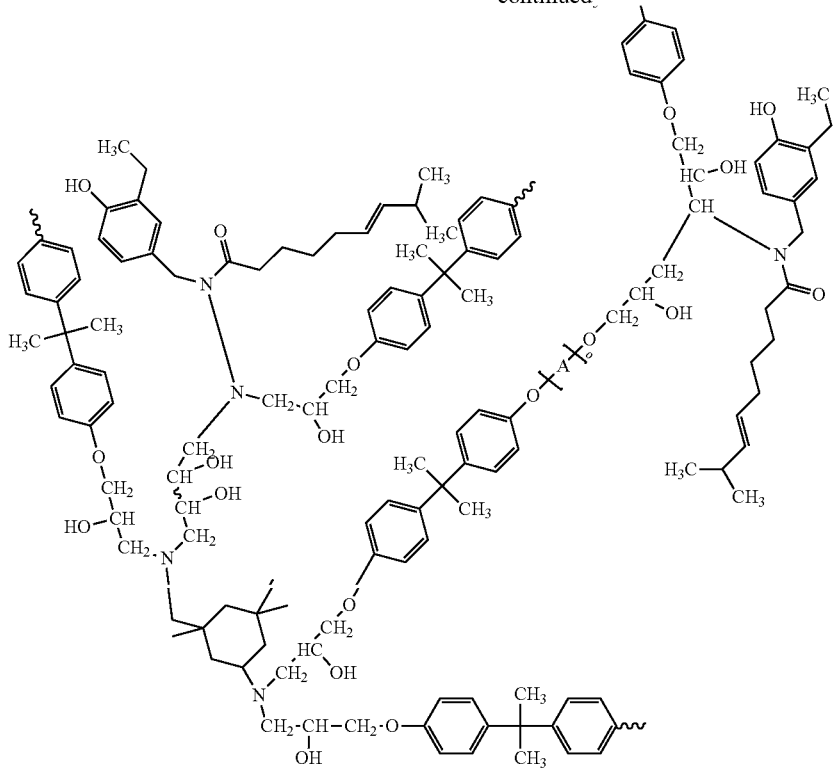

In one or more embodiments, the antifouling material 110 may comprise the polymer and the toxin in an amount of at least 80 wt. %, at least 82 wt. %, at least 84 wt. %, at least 86 wt. %, at least 88 wt. %, at least 90 wt. %, at least 92 wt. %, at least 94 wt. %, at least 96 wt. %, at least 98 wt. %, at least 99 wt. %, at least 99.5 wt. %, at least 99.9 wt. %, or even at least 99.99 wt. %.

In embodiments where the epoxy prepolymer comprises diglycidyl ether of bisphenol prepolymer (DGEBA) and the curing agent comprises 4,4'-methylenedianiline (IPDA), the antifouling material 110 may comprise the polymer and the curing agent in a 4:1 wt. % ratio of polymer to curing agent. The antifouling material 110 may comprise the polymer in an amount of from 72 wt. % to 80 wt. %. The antifouling material 110 may comprise the polymer in an amount of at least 72 wt. %, at least 73 wt. %, at least 74 wt. %, at least 75 wt. %, at least 76 wt. %, at least 77 wt. %, at least 78 wt. %, at least 79 wt. %, or even at least 79.9 wt. %. The antifouling material 110 may comprise the curing agent in an amount of from 18 wt. % to 20 wt. %. The antifouling material 110 may comprise the curing agent in an amount of at least 18 wt. %, at least 18.5 wt. %, at least 19 wt. %, at least 19.5 wt. %, or even at least 19.9 wt. %. The antifouling material 110 may comprise the toxin in an amount of from 0.1 wt. % to 10 wt. %. The antifouling material 110 may comprise the toxin in an amount of at least 0.1 wt. %, at least 0.5 wt. %, at least 1 wt. %, at least 2 wt. %, at least 3 wt. %, at least 4 wt. %, at least 5 wt. %, at least 6 wt. %, at least 7 wt. %, at least 8 wt. %, at least 9 wt. %, or even at least 9.9 wt. %.

Figure 2:
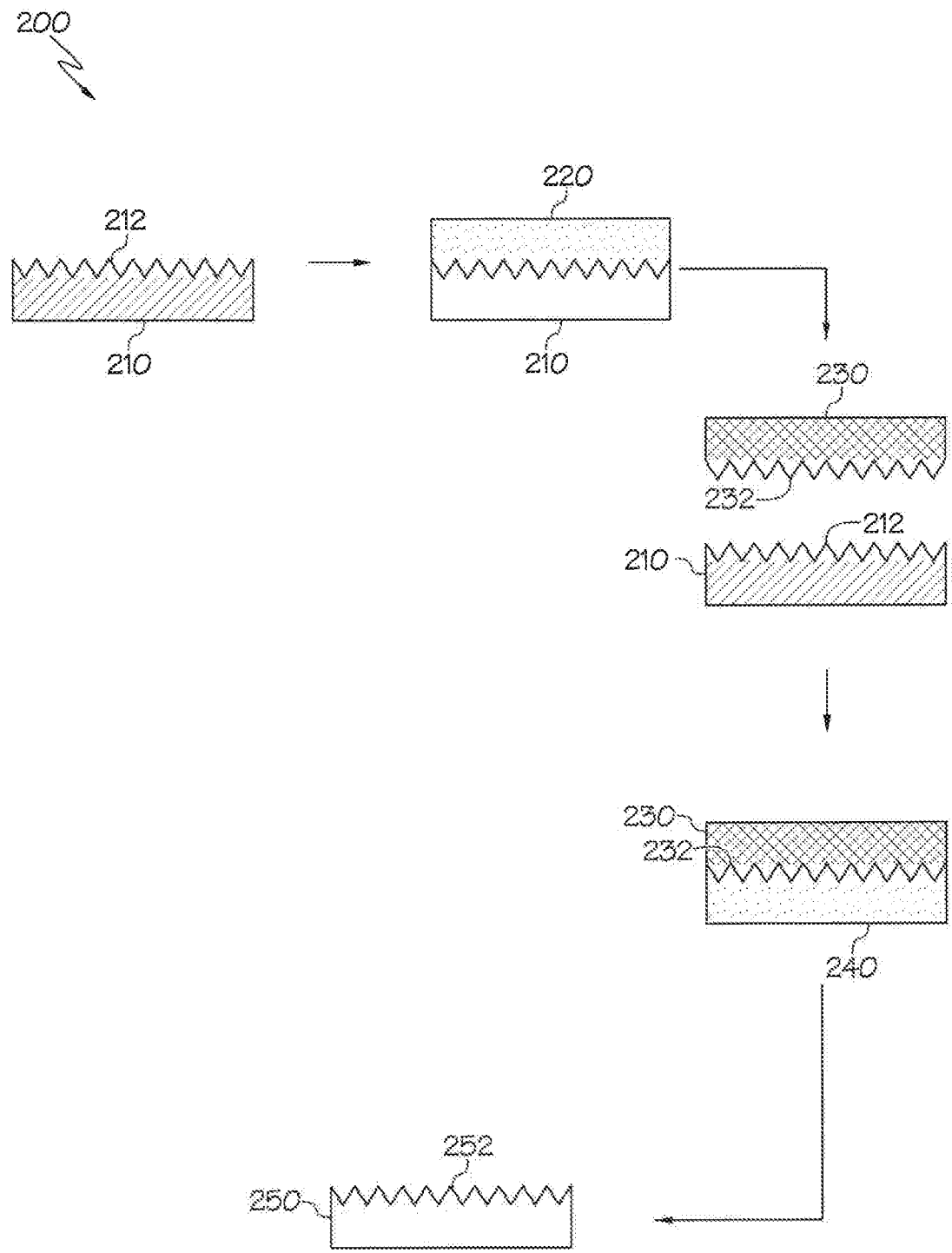
FIG. 2 is a flow chart showing process steps whereby an antifouling coating is produced, according to one or more embodiments of the present disclosure.

Now, referring to FIG. 2, according to one or more embodiments, the antifouling material 250 may be made by a process 200 generally comprising the steps of forming a nanostructured mold 230 and then using the formed nanostructured mold 230 to form the antifouling material 250. For example, as depicted in FIG. 2, the nanostructured mold 230 is formed by contacting a liquid mold precursor 220 with a textured surface 212 of a nanostructured template 210. The liquid mold precursor 220 may polymerize, may cure, and then may be removed from the nanostructured template 210. A liquid precursor mixture 240 may then be contacted with the textured surface 232 of the nanostructured mold 230. The liquid precursor mixture 240 may polymerize, may cure, and then may be removed from the nanostructured mold 230.

In one or more embodiments, the process 200 of forming the antifouling material 250 comprises first forming a nanostructured mold 230. The term "nanostructured mold" may refer to a material that has at least one nanostructured surface that can then be replicated onto another material. In one or more embodiments, the process of forming the nanostructured mold 230 comprises contacting the liquid mold precursor 220 with the textured surface 212 of the nanostructured template 210. The term "liquid mold precursor" may refer to a liquid solution comprising at least a prepolymer. The term "textured surface", as used here, may refer to the nanostructured surface of the nanostructured template 210. The term "nanostructured template" may refer to a material for which the textured portion 232 of the formed nanostructured mold 230 is replicated. For example, in one or more embodiments, the liquid mold precursor 220 may contain polydimethylsiloxane (PDMS) precursors in solution and the nanostructured template 210 may be a lotus leaf, where the liquid PDMS precursor solution is contacted with the nanotextured surface of the lotus leaf.

In one or more embodiments, the nanostructured template 210 may comprise a material that comprises at least one textured surface 212 with a nanostructure that may be replicated onto the nanostructured mold 230. In one or more embodiments, the nanostructured template 210 may be a lotus leaf, flower petal, animal wing, shark fin, a combination thereof, or any similar material that has a natural hydrophobic or superhydrophobic nanostructured surface. In one or more embodiments, the nanostructure of the textured surface 212 of the nanostructured template 210 may be artificially made by any known means in the art that results in the textured surface 212 comprising protruding features that are all discernible in nanoscale measurements (such as less than 100 nm).

In one or more embodiments, contacting the liquid mold precursor 220 with the textured surface 212 of the nanostructured template 210 may include contacting the liquid mold precursor 220 to the textured surface 212 of the nanostructured template 210. In one or more embodiments, contacting the liquid mold precursor 220 to the textured surface 212 of the nanostructured template 210 may include pouring the liquid mold precursor 220, dropping the liquid mold precursor 220, flowing the liquid mold precursor 220, spilling the liquid mold precursor 220, discharging the liquid mold precursor 220, or any method of the like, onto the textured surface 212 of the nanostructured template 210. For example, in one or more embodiments, the liquid mold precursor 220 may contain polydimethylsiloxane (PDMS) precursors in solution and the nanostructured template 210 may be a lotus leaf, where the liquid PDMS precursor solution is poured onto the nanotextured surface of the lotus leaf.

In one or more embodiments, contacting the liquid mold precursor 220 with the textured surface 212 of the nanostructured template 210 may comprise contacting the textured surface 212 of the nanostructured template 210 onto the liquid mold precursor 220. In one or more embodiments, contacting the textured surface 212 of the nanostructured template 210 onto the liquid mold precursor 220 may include pressing the textured surface 212 of the nanostructured template 210, printing the textured surface 212 of the nanostructured template 210, stamping the textured surface 212 of the nanostructured template 210, etching the textured surface 212 of the nanostructured template 210, or any method of the like, onto the liquid mold precursor 220. For example, in one or more embodiments, the nanostructured surface of the lotus leaf may be pressed into the liquid PDMS precursor solution.

In one or more embodiments, the process of forming the nanostructured mold 230 further comprises solidifying the liquid mold precursor 220 over the textured surface 212 of the nanostructured template 210. In one or more embodiments, the solidifying of the liquid mold precursor 220 may be achieved by allowing the liquid mold precursor 220 to polymerize over the textured surface 212 of the nanostructured template 210. The term "polymerize", "polymerizing", or the like refer to the act of same or different type monomers reacting with each other and/or other reactants to form a polymer chain.

In one or more embodiments, the solidifying of the liquid mold precursor 220 may be done by further allowing the liquid mold precursor 220 to cure to the nanostructured template 210. The term "cure" refers to when a chemical reaction takes place, resulting in a harder and more stable polymer material by facilitating the bonding of the molecular components of the material. In one or more embodiments, the liquid mold precursor 220 may cure to the nanostructured template 210 by heating the liquid mold precursor 220, by adding chemical additives to the liquid mold precursor 220, by applying ultraviolet radiation to the liquid mold precursor 220, or any other similar method that stabilizes the polymer by facilitating the bonding of the molecular components of the material. For example, in one or more embodiments, the liquid mold precursor 220 may be placed in a heated system to a temperature approaching 80° C. in order to cure and accelerate the solidification of the liquid mold precursor 220.

In one or more embodiments, the formed nanostructured mold 230, now a solidified polymer, may be removed from the nanostructured template 210. In one or more embodiments, the nanostructured mold 230 may be removed from the nanostructured template 210 in any way that detaches the nanostructured mold 230 from the nanostructured template 210 while maintaining the formed nanostructured texture 232 of the nanostructured mold 230. In additional embodiments, the nanostructured template 210 may be removed from the nanostructured mold 230 in any way that detaches the nanostructured template 210 from the nanostructured mold 230 while maintaining the formed nanostructured texture 232 of the nanostructured mold 230. For example, in one or more embodiments, the nanostructured mold 230 may comprise solidified PDMS and may be removed from the nanostructured template 210 by carefully peeling off the solidified PDMS mold. In another example, the nanostructured template 210 may be removed from the solidified PDMS mold by peeling off the nanostructured template 210 from the solidified PDMS mold.

In one or more embodiments, the nanostructured mold 230 comprises a textured surface 232 having a complementary surface with respect to the textured surface 212 of the nanostructured template 210. The term "complementary surface" may refer to two surfaces having similar, or even identical, physical textures opposite one another. For example, in one or more embodiments, the nanostructure texture 212 of the nanostructured template 210 is oppositely similar, or even identical, to the nanostructure texture 232 of the nanostructured mold 230. In one or more embodiments, the textured surface 212 of the nanostructured template 210 has a complementary surface with respect to the textured surface 252 of the antifouling material 250. For example, in one or more embodiments, the textured surface 212 of the nanostructured template 210 is oppositely similar, or even identical, to the textured surface 252 of the antifouling material 250.

In one or more embodiments, at least a portion of the surface of the nanostructured mold 230 that contacts the textured surface 212 of the nanostructured template 210 may comprise nanotexture. In one or more embodiments, the entire, or near entire, surface of the nanostructured mold 230 that contacts the textured surface 212 of the nanostructured template 210 may comprise nanotexture. For example, in one or more embodiments, the surface of the nanostructured mold 230 that contacts the textured surface 212 of the nanostructured template 210 may comprise at least 90%, at least 92%, at least 94%, at least 96%, at least 98%, at least 99%, at least 99.5%, and even at least 99.9% nanotexture.

In one or more embodiments, the textured surface 212 of the nanostructured template 210, the textured surface 232 of the nanostructured mold 230, or both, has a water contact angle of at least 100 degrees. For example, in one or more embodiments, the textured surface 212 of the nanostructured template 210 may have a water contact angle of at least 110 degrees, at least 120 degrees, at least 130 degrees, at least 140 degrees, at least 150 degrees, or even at least 160 degrees. For example, in one or more embodiments, the textured surface 232 of the nanostructured mold 230 may have a water contact angle of at least 110 degrees, at least 120 degrees, at least 130 degrees, at least 140 degrees, at least 150 degrees, or even at least 160 degrees.

In one or more embodiments, the process of forming the antifouling material 250 further comprises contacting a liquid precursor mixture 240 with the textured surface 232 of the nanostructured mold 230. The term "liquid precursor mixture" may refer to a liquid solution comprising at least a prepolymer. In one or more embodiments, the liquid precursor mixture 240 may comprise a prepolymer and a toxin, a prepolymer and a curing agent, or a combination of a prepolymer, toxin, and curing agent. For example, in one or more embodiments, the prepolymer may be an epoxy prepolymer. For example, the epoxy prepolymer may be diglycidyl ether of bisphenol A (DGEBA). In one or more embodiments, the toxin may be capsaicin, or a similar alkaloid. The term "alkaloid" refers to a class of naturally occurring organic compounds that contain at least one nitrogen atom. In one or more embodiments, the curing agent may be isophorone diamine or 4,4'-methylenedianiline (IPDA).

In one or more embodiments, contacting the liquid precursor mixture 240 with the textured surface 232 of the nanostructured mold 230 may include contacting the liquid precursor mixture 240 to the textured surface 232 of the nanostructured mold 230. In one or more embodiments, contacting the liquid precursor mixture 240 to the textured surface 232 of the nanostructured mold 230 may include pouring the liquid precursor mixture 240, dropping the liquid precursor mixture 240, flowing the liquid precursor mixture 240, spilling the liquid precursor mixture 240, discharging the liquid precursor mixture 240, or any method of the like, onto the textured surface 232 of the nanostructured mold 230. For example, in one or more embodiments, the liquid precursor mixture 240 may include a DGEBA, capsaicin, and isophorone diamine solution, where the solution is poured onto the textured surface 232 of the nanostructured mold 230.

In one or more embodiments, contacting the liquid precursor mixture 240 with the textured surface 232 of the nanostructured mold 230 may comprise contacting the textured surface 232 of the nanostructured mold 230 onto the liquid precursor mixture 240. In one or more embodiments, contacting the textured surface 232 of the nanostructured mold 230 onto the liquid precursor mixture 240 may include pressing the textured surface 232 of the nanostructured mold 230, printing the textured surface 232 of the nanostructured mold 230, stamping the textured surface 232 of the nanostructured mold 230, etching the textured surface 232 of the nanostructured mold 230, or any method of the like, onto the liquid precursor mixture 240. For example, in in one or more embodiments, the textured surface 232 of the nanostructured mold 230 may be pressed into the liquid DGEBA, capsaicin, and isophorone diamine solution.

In one or more embodiments, the process of forming the antifouling material 250 further comprises solidifying the liquid precursor mixture 240 over the textured surface 232 of the nanostructured mold 230. In one or more embodiments, the solidifying of the liquid precursor mixture 240 may be done by allowing the liquid precursor mixture 240 to polymerize over the textured surface 232 of the nanostructured mold 230.

In one or more embodiments, the solidifying of the liquid precursor mixture 240 may be done by further allowing the liquid precursor mixture 240 to cure to the nanostructured mold 230. In one or more embodiments, the liquid precursor mixture 240 may cure to the nanostructured mold 230 by heating the liquid precursor mixture 240, by adding chemical additives to the liquid precursor mixture 240, by applying ultraviolet radiation to the liquid precursor mixture 240, or any other similar method, that stabilizes the polymer by facilitating the bonding of the molecular components of the material. For example, in one or more embodiments, the liquid precursor mixture 240 may be placed in a heated system to a temperature approaching 80° C. in order to cure and accelerate the solidification of the liquid precursor mixture 240.

In one or more embodiments, the formed antifouling material 250, now a solidified polymer, may be removed from the nanostructured mold 230. In one or more embodiments, the antifouling material 250 may be removed from the nanostructured mold 230 in any way that detaches the antifouling material 250 from the nanostructured mold 230 while maintaining the formed nanostructured texture 252 of the antifouling material 250. In additional embodiments, the nanostructured mold 230 may be removed from the antifouling material 250 in any way that detaches the nanostructured mold 230 from the antifouling material 250 while maintaining the formed nanostructured texture 252 of the antifouling material 250. For example, in one or more embodiments, the antifouling material 250 may comprise at least solidified epoxy and may be removed from the nanostructured PDMS mold by carefully peeling off the solidified antifouling material 250. In another example, the nanostructured PDMS mold may be removed from the solidified antifouling material 250 by carefully peeling off the nanostructured PDMS mold from the solidified antifouling material 250.

In one or more embodiments, at least a portion of the surface of the antifouling material 250 that contacts the textured surface 232 of the nanostructured mold 230 may comprise nanotexture. In one or more embodiments, the entire, or near entire, surface of the antifouling material 250 that contacts the textured surface 232 of the nanostructured mold 230 may comprise nanotexture. For example, in one or more embodiments, the surface of the antifouling material 250 that contacts the textured surface 232 of the nanostructured mold 230 may comprise at least 90%, at least 92%, at least 94%, at least 96%, at least 98%, at least 99%, at least 99.5%, and even at least 99.9% nanotexture.

EXAMPLES

Examples are provided herein which may disclose one or more embodiments of the present disclosure. However, the Examples should not be viewed as limiting on the claimed embodiments hereinafter provided.

Example 1—Fabrication of Antifouling and Superhydrophobic Material

An antifouling, superhydrophobic coating composition was prepared. A lotus leaf was used as the nanostructured template where the lotus leaf's nanotexture was replicated onto the final antifouling material. The liquid mold precursor was a polydimethylsiloxane (PDMS) precursor solution that was applied to the lotus leaf template. The PDMS precursor solution was made by mixing 10 g of Sylgard 184 Silicone Elastomer resin and 1 g of a hardening agent for 2 minutes. This PDMS precursor solution was degassed by using a vacuum pump to remove air bubbles from the solution. The PDMS precursor solution was allowed to polymerize over the lotus leaf template and harden. The PDMS precursor solution was hardened by placing the solution in an oven at a temperature approaching 80° C. for 4 hours and then taken out of the oven to cool at room temperature for 1 hour. When the PDMS precursor solution was sufficiently hardened to the lotus leaf template, the hardened PDMS mold was carefully peeled from the lotus leaf template, thus creating a nanostructured mold intermediate made of the solidified PDMS where the nanostructured mold's surface replicated the lotus leaf's nanotexture.

The liquid precursor mixture contained capsaicin, diglycidyl ether of bisphenol prepolymer (DGEBA), and isophorone diamine. The DGEBA and isophorone diamine were mixed in a 4:1 ratio of DGEBA to isophorone diamine and capsaicin was then added. This mixture was applied to the nanotextured surface of the nanostructured mold and allowed to polymerize and harden onto the nanostructured mold. The mixture was placed in a heated system to a temperature approaching 80° C. in order to cure and accelerate the solidification of the mixture onto the nanostructured mold. When the mixture was sufficiently hardened to the nanostructured mold, the hardened mixture was carefully peeled from the nanostructured mold, thus creating a final antifouling material where the antifouling material's surface replicated the nanostructured mold's, and thus the lotus leaf's, nanotexture.

The capsaicin was extracted from habanero peppers by cutting them into small pieces, drying them in an oven for 5 days at 35° C., grounding them to a powder, placing the powder in ethanol for 3 days, obtaining the resulting red filtrate by filtering the solution with 0.45 μm filter paper, and evaporating the red filtrate at room temperature to leave solid capsaicin.

Example 2—Antifouling Tests of Coated Surfaces

In one test, four coating surfaces were prepared to examine each surface's ability to deter bacterial growth and biofilm formation. Each surface was coated with a coating either having nanostructure prepared by the molding process using a lotus leaf as the nanostructured template as described herein, capsaicin as the toxin, both, or neither. Each surface was submerged in natural seawater enriched with commercially available aerobic bacteria media to provide nutrients for bacterial growth. After one month, the bacteria DNA from each surface was extracted and measured using a quantitative polymerase chain reaction.

The first surface was coated with a coating containing no nanostructure and no capsaicin. This first surface coating was not prepared using the molding methods as described herein. The second surface was coated with a coating containing a nanostructure, but no capsaicin. This second surface coating was prepared using the molding methods as described herein, except no toxin was added to the liquid precursor mixture. The third surface was coated with a coating containing capsaicin, but no nanostructure. This third surface coating was not prepared using the molding methods described herein. The fourth surface was coated with a coating containing both a nanostructure and capsaicin. This fourth surface coating was prepared using the molding methods as described herein, where capsaicin was added to the liquid precursor mixture.

As shown in Table 1, the fourth surface coating that included both a nanostructured surface and capsaicin totaled $6.81*10^4$ bacterial DNA units per gram. The first surface coating that did not include either a nanostructured surface or capsaicin totaled $8.99*10^8$ bacterial DNA units per gram. As such, the fourth surface coating was able to decrease the number of bacterial attachments up to four orders of magnitude better than the first surface coating.

TABLE 1

| Surface | Surface Features | Total Number of Bacteria/g |
|---|---|---|
| 1 | No Nanostructure, No Capsaicin | $8.99 * 10^8$ |
| 2 | Nanostructure, No Capsaicin | $1.32 * 10^5$ |
| 3 | No Nanostructure, Capsaicin | $4.33 * 10^8$ |
| 4 | Nanostructure, Capsaicin | $6.81 * 10^4$ |

The present disclosure includes one or more non-limiting aspects. A first aspect includes a method for making an antifouling material, the method comprising: forming a nanostructured mold, wherein forming the nanostructured mold comprises contacting a liquid mold precursor with a textured surface of a nanostructured template, solidifying the liquid mold precursor to form the nanostructured mold, and separating the nanostructured mold and the nanostructured template. The nanostructured mold comprises textured surface having a complementary surface with respect to the textured surface of the nanostructured template, such that at least a portion of the nanostructured mold comprises a nanostructured surface. A method for making an antifouling material comprises forming the antifouling material, wherein forming the antifouling material comprises contacting a liquid precursor mixture with a textured surface of the nanostructured mold, solidifying the liquid precursor mixture to form the antifouling material, and separating the antifouling material and the nanostructured mold. The antifouling material comprises a textured surface having a complementary surface with respect to the textured surface of the nanostructured mold, such that at least a portion of the antifouling material comprises a nanostructured surface. The liquid precursor mixture comprises a polymer precursor. The antifouling material comprises a polymer. The liquid precursor mixture and the antifouling material comprise a toxin.

A second aspect includes any above aspect, wherein contacting the liquid mold precursor with the textured surface of the nanostructured template includes contacting the liquid mold precursor to the textured surface of the nanostructured template, contacting the textured surface of the nanostructured template to the liquid mold precursor, or both.

A third aspect includes any above aspect, wherein contacting the liquid precursor mixture with the textured surface of the nanostructured mold includes contacting the liquid precursor mixture to the textured surface of the nanostructured mold, contacting the textured surface of the nanostructured mold to the liquid precursor mixture, or both.

A fourth aspect includes any above aspect, wherein solidifying the liquid mold precursor includes polymerizing the liquid mold precursor, curing the liquid mold precursor, or both.

A fifth aspect includes any above aspect, wherein solidifying the liquid precursor mixture includes polymerizing the liquid precursor mixture, curing the liquid precursor mixture, or both.

A sixth aspect includes any above aspect, wherein separating the nanostructured mold and the nanostructured template includes removing the nanostructured mold from the nanostructured template, removing the nanostructured template from the nanostructured mold, or both.

A seventh aspect includes any above aspect, wherein separating the antifouling material and the nanostructured mold includes removing the antifouling material from the nanostructured mold, removing the nanostructured mold from the antifouling material, or both.

An eighth aspect includes any above aspect, wherein the textured surface of the nanostructured template, the textured surface of the nanostructured mold, or both, has a water contact angle of at least 100 degrees.

A ninth aspect includes any above aspect, wherein the textured surface of the nanostructured template has a complementary surface to the textured surface of the antifouling material.

A tenth aspect includes any above aspect, wherein at least 90% of the nanostructured mold surface that contacts the textured surface of the nanostructured template comprises a nanostructured surface.

An eleventh aspect includes any above aspect, wherein at least 90% of the antifouling material surface that contacts the textured surface of the nanostructured mold comprises a nanostructured surface.

A twelfth aspect includes any above aspect, wherein the toxin is capsaicin.

A thirteenth aspect includes any above aspect, wherein the polymer of the antifouling material is an epoxy.

A fourteenth aspect includes any above aspect, wherein the nanostructured mold comprises a polymer.

A fifteenth aspect includes any above aspect, wherein the polymer precursor comprises an epoxy prepolymer and a curing agent.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that where a first component is described as "comprising" a second component, it is contemplated that, in some embodiments, the first component "consists" or "consists essentially of" that second component. It should further be understood that where a first component is described as "comprising" a second component, it is contemplated that, in some embodiments, the first component comprises at least 10%, at least 20%, at least 30%, at least 40%, at least 50%, at least 60%, at least 70%, at least 80%, at least 90%, at least 95%, or even at least 99% that second component (where % can be weight % or molar %).

What is claimed is:

1. A method for making an antifouling material, the method comprising:
    forming a nanostructured mold, wherein:
        forming the nanostructured mold comprises contacting a liquid mold precursor with a textured surface of a nanostructured template, solidifying the liquid mold precursor to form the nanostructured mold, and separating the nanostructured mold and the nanostructured template;
        the nanostructured mold comprises a textured surface having a complementary surface with respect to the textured surface of the nanostructured template, such that at least a portion of the nanostructured mold comprises a nanostructured surface; and
    forming the antifouling material, wherein:
        forming the antifouling material comprises:
            contacting a liquid precursor mixture with a textured surface of the nanostructured mold, wherein the liquid precursor mixture comprises a polymer precursor, wherein the polymer precursor comprises an epoxy prepolymer and a curing agent, wherein the liquid precursor mixture comprises a toxin, wherein the toxin is capsaicin, and wherein the capsaicin is not covalently bonded to another compound when the capsaicin is in the liquid precursor mixture;

solidifying the liquid precursor mixture to form the antifouling material, wherein the antifouling material comprises a polymer formed from the polymer precursor, wherein the antifouling material comprises the toxin, and wherein the capsaicin in the antifouling material is covalently bonded to the polymer; and separating the antifouling material and the nanostructured mold; and the antifouling material comprises a textured surface having a complementary surface with respect to the textured surface of the nanostructured mold, such that at least a portion of the antifouling material comprises a nanostructured surface.

2. The method of claim 1, wherein contacting the liquid mold precursor with the textured surface of the nanostructured template includes contacting the liquid mold precursor to the textured surface of the nanostructured template, contacting the textured surface of the nanostructured template to the liquid mold precursor, or both.

3. The method of claim 1, wherein contacting the liquid precursor mixture with the textured surface of the nanostructured mold includes contacting the liquid precursor mixture to the textured surface of the nanostructured mold, contacting the textured surface of the nanostructured mold to the liquid precursor mixture, or both.

4. The method of claim 1, wherein solidifying the liquid mold precursor includes polymerizing the liquid mold precursor, curing the liquid mold precursor, or both.

5. The method of claim 1, wherein solidifying the liquid precursor mixture includes polymerizing the liquid precursor mixture, curing the liquid precursor mixture, or both.

6. The method of claim 1, wherein separating the nanostructured mold and the nanostructured template includes removing the nanostructured mold from the nanostructured template, removing the nanostructured template from the nanostructured mold, or both.

7. The method of claim 1, wherein separating the antifouling material and the nanostructured mold includes removing the antifouling material from the nanostructured mold, removing the nanostructured mold from the antifouling material, or both.

8. The method of claim 1, wherein the textured surface of the nanostructured template, the textured surface of the nanostructured mold, or both, has a water contact angle of at least 100 degrees.

9. The method of claim 1, wherein the textured surface of the antifouling material mirrors the textured surface of the nanostructured template.

10. The method of claim 1, wherein at least 90% of the nanostructured mold surface that contacts the textured surface of the nanostructured template comprises a nanostructured surface.

11. The method of claim 1, wherein at least 90% of the antifouling material surface that contacts the textured surface of the nanostructured mold comprises a nanostructured surface.

12. The method of claim 1, wherein the nanostructured mold comprises a polymer.

13. The method of claim 1, wherein the antifouling material comprises from 0.1 wt. % to 10 wt. % of the toxin.

14. The method of claim 1, wherein the antifouling material comprises from 1 wt. % to 10 wt. % of the toxin.

* * * * *